United States Patent
Neuroth et al.

(10) Patent No.: US 8,567,042 B2
(45) Date of Patent: Oct. 29, 2013

(54) METHOD OF ASSEMBLING AND OPERATING A SUBMERSIBLE PUMP MOTOR

(75) Inventors: David H. Neuroth, Clayton, NY (US); Van J. McVicker, Collinsville, OK (US); Sean A. Cain, Owasso, OK (US); Jim F. Evenson, Claremore, OK (US); Larry J. Parmeter, Broken Arrow, OK (US); Chad A. Craig, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 344 days.

(21) Appl. No.: 12/854,693

(22) Filed: Aug. 11, 2010

(65) Prior Publication Data

US 2011/0037332 A1    Feb. 17, 2011

Related U.S. Application Data

(60) Provisional application No. 61/233,024, filed on Aug. 11, 2009.

(51) Int. Cl.
*H02K 15/00* (2006.01)
(52) U.S. Cl.
USPC .................................. 29/596; 29/428; 29/598

(58) Field of Classification Search
USPC .................. 29/596, 428, 598; 310/87, 90, 91; 384/37, 218, 428
See application file for complete search history.

(56) References Cited

U.S. PATENT DOCUMENTS

| | | | |
|---|---|---|---|
| 4,513,215 A | 4/1985 | Del Serra | |
| 4,521,708 A | 6/1985 | Vandevier | |
| 5,189,328 A | 2/1993 | Knox | |
| 6,557,905 B2 | 5/2003 | Mack | |
| 6,956,310 B1 | 10/2005 | Knox | |
| 7,492,069 B2 | 2/2009 | Knox | |

*Primary Examiner* — Thiem Phan
(74) *Attorney, Agent, or Firm* — Bracewell & Giuliani LLP

(57) ABSTRACT

A submersible well pump motor has features to prevent the carrier bearing from sliding axially along the stator due to thermal growth of the rotor. The rotor has a shaft and rotor sections spaced apart from each other. Carrier bearings are located between the rotor sections, each having an anti-rotation member that frictionally engages the inner diameter of the stator to prevent spinning of the carrier bearing. A deflectable thrust washer may be located between ends of the carrier bearing and the rotor sections. The thrust washer reduces in thickness in response to an axial thermal growth force due to axial thermal growth movement of the rotor sections and shaft. The thermal growth force is less than an amount of dislodging force required to cause the anti-rotation member to axially move relative to the stator. Rather than deflectable thrust washers, sacrificial thrust washers that dissolve prior to normal operation may be used.

8 Claims, 6 Drawing Sheets

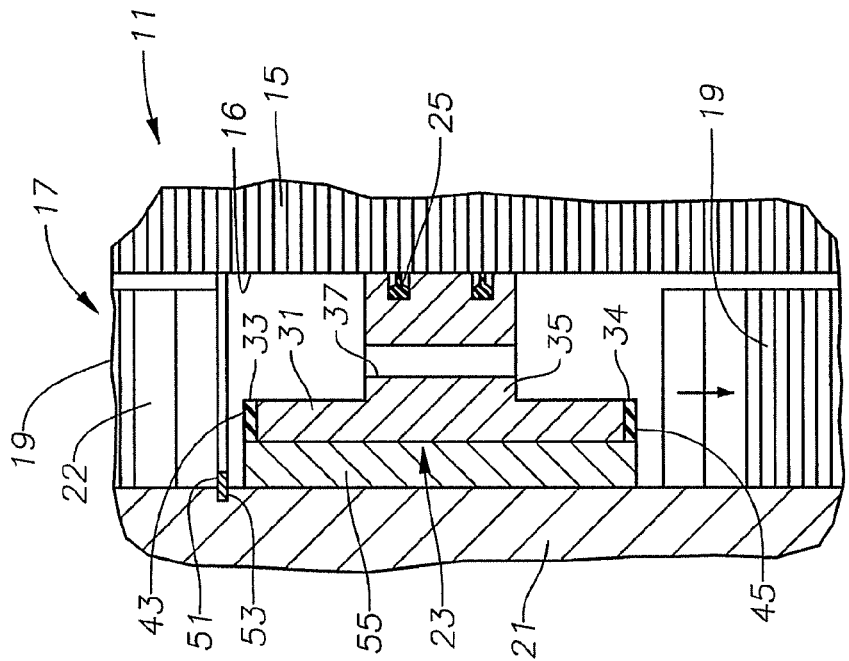
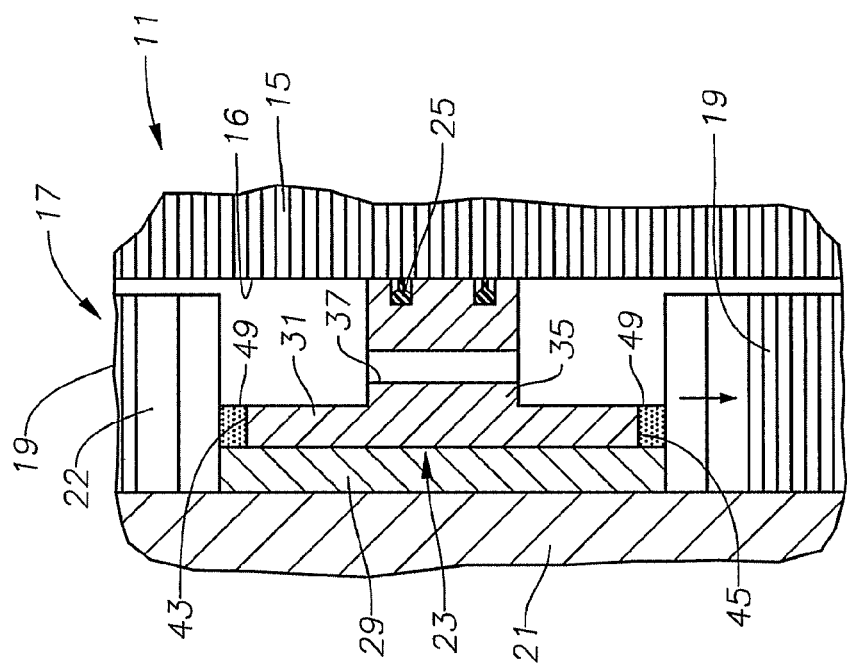
Fig. 7
Fig. 6

US 8,567,042 B2

METHOD OF ASSEMBLING AND OPERATING A SUBMERSIBLE PUMP MOTOR

CROSS-REFERENCE TO RELATED APPLICATION

This application claims priority to provisional application Ser. No. 61/233,024, filed Aug. 11, 2009.

FIELD OF THE INVENTION

This invention relates in general to electrical submersible pump motors and in particular to carrier bearings for supporting the shaft of the rotor with features to prevent the carrier bearings from axially sliding relative to the stator due to thermal growth of the rotor.

BACKGROUND OF THE INVENTION

Electrical submersible pump (ESP) motors can be very long and small in diameter. To obtain sufficient horsepower, multiple rotor sections are mounted on the same shaft inside the stator with support bearings between each rotor section and on each end of the rotor stack. These bearings consist of a journal bearings with a bushing mounted on and rotating with the shaft and a corresponding carrier bearing placed over the bushing and in frictional engagement with the inside diameter of the stator. A thrust washer is usually placed on either side of the rotor carrier bearing between the carrier bearing and the adjacent rotor sections.

The rotor stack is supported at its lower end by a retainer on the shaft. A thrust bearing supports the shaft at the top end of the motor. When the motor heats up, the rotor shaft elongates in a downward direction due to thermal expansion, while the rotors simultaneously thermally expand upward along the shaft. The amount of relative motion depends on the properties of materials involved, the rotors being dominated by copper and the shaft by steel. The thermal growth can result in relative movement of the carrier bearings with respect to the stator. Under certain temperature profiles, the rotor carrier bearings are forced to move with respect to the motor stator housing. This movement may occur when the motor experiences large temperature changes when energized, such as in cool subsea or cool well applications, or when the motor is placed in very hot conditions such as in steam heated viscous oil well applications. This movement of the carrier bearings relative to the stator results when axial forces from the spinning rotor sections press against the thrust washers, which in turn press against one side of the carrier bearings, forcing them to move to accommodate the thermal expansion discussed above. Great care must be taken to ensure the carrier bearings can move with sufficient ease as to not impose excessive forces on the thrust washers and at the same time not be so loose a fit in the stator as to cause the carrier bearings to spin within the stator or cock and jamb when being moved. These two conflicting requirements require very precise fitting of the carrier bearing to the inside of the housing and even a change of less than 0.001" can be the difference between a successful design and motor failure. It is an object of this invention to eliminate this critical design issue, making the motor easier to manufacture and more reliable in extreme temperature applications.

SUMMARY

In this invention, the rotor assembly has rotor sections spaced apart from each other. A carrier bearing having an anti-rotation member is located between each of the rotor sections. During assembly, the rotor assembly is inserted into the bore of the stator with the anti-rotation members in frictional engagement with the stator. During operation, the shaft and the rotor sections are allowed to grow axially in response to an increase in temperature of the motor. The rotor assembly is arranged such that any thermal growth axial force imposed on a central portion of the carrier bearing due to the thermal growth is less than a dislodging force required to move the anti-rotational member axially within the stator.

In one embodiment, the arrangement of the rotor assembly comprises mounting a deflectable thrust washer between a hub of the carrier bearing and an end of the adjacent rotor section. The thermal growth causes the deflectable thrust washer to reduce in thickness in response to a thermal growth axial force that is less than the dislodging force. The thrust washer may be formed of a deformable material. Alternately, the thrust washer may be elastically movable from a maximum to a minimum thickness and biased to the maximum thickness.

In another embodiment, a bushing may be mounted to the shaft for rotation therewith and axially movable relative to the shaft. The bushing is located between the rotor sections, surrounded by the carrier bearing, and has an axial length greater than an axial length of the central portion of the carrier bearing.

In still another embodiment, the bushing for each carrier bearing may have a length greater than the central portion of the carrier bearing. During assembly, a technician inserts the rotor assembly into a bore of the stator in a first direction, axially sliding the anti-rotational members in frictional engagement with the bore of the stator. The frictional engagement causes each carrier bearing to contact one of the rotor sections. When the anti-rotational members are at desired axial positions within the bore of the stator, the technician moves the shaft, the rotor sections and the bushings in an opposite direction a selected axial increment relative to the carrier bearings. The carrier bearings are held against axial movement by the frictional engagement of the anti-rotation members with the bore of the stator. This selected axial increment of movement axially centers the carrier bearings between the rotor sections.

In another embodiment, the central portion of each carrier bearing has a hub with sacrificial washers on each end of the hub. The central portion of the carrier bearing has an axial length equal to an axial length of the bushing. After assembly, the thrust washers are dissolved, leaving axial gaps between each of the ends of each hub and adjacent rotor sections.

In another embodiment, the rotor sections have lower ends fixed by retainers to the shaft so as to be axially movable with the shaft. The upper ends of the rotors sections are free for relative axial movement between the shaft and the rotors sections. The bushings between the rotor sections are shorter than the axial distances between the rotor sections. This arrangement prevents thermal growth of a lower rotor section from transmitting through the bushing to the next rotor section.

BRIEF DESCRIPTION OF THE DRAWINGS

FIG. 6 is a view of a carrier bearing similar to the view shown in FIG. 5, but illustrating the use of a third embodiment, which is to utilize a sacrificial spacer ring to space the carrier bearing between adjacent rotor sections.

FIG. 7 is a sectional view of a carrier bearing and rotor having a fourth embodiment of a feature to prevent axial sliding of the carrier bearing relative to the stator.

DETAILED DESCRIPTION OF THE INVENTION

Figure 1:
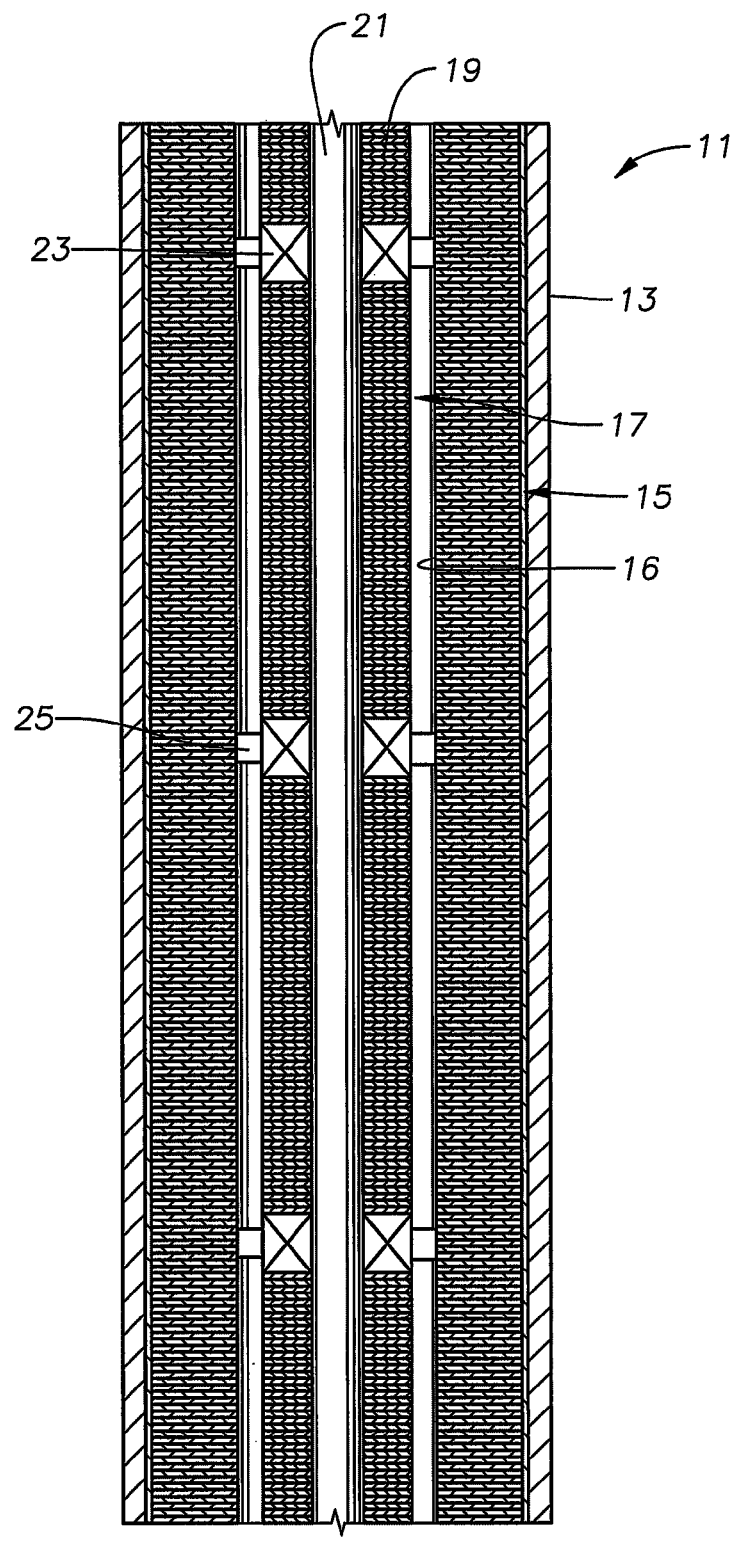
FIG. 1 is a schematic sectional view of a portion of an electrical submersible pump (ESP) motor constructed in accordance with this invention.

Referring to FIG. 1, motor 11 has a cylindrical housing 13. A stator 15 is fixed for non-rotation within housing 13. Stator 15 is made up of a large number of flat, thin disks or laminations stacked one on top of each other. Windings (not shown) extend through holes spaced around stator 15 for creating an electromagnetic field. Each of the laminations of stator 15 has a large central aperture creating an inner diameter 16 that is constant throughout the length of stator 15. Stator 15 is axially fixed to housing 13 at its lower and upper ends and can thermally expand and contract with housing 13.

Figure 2:
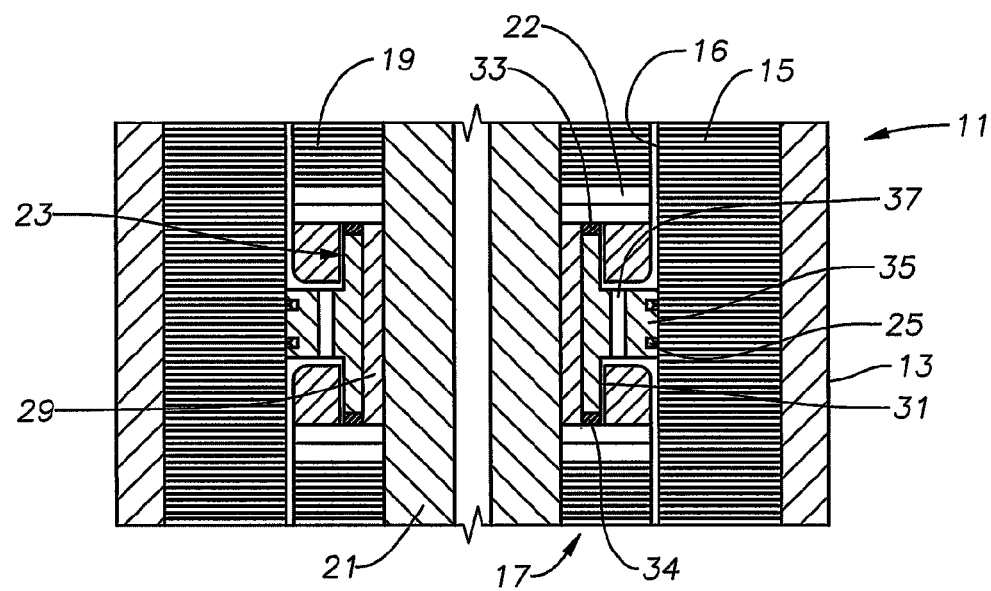
FIG. 2 is an enlarged sectional view of a portion of the motor of FIG. 1, illustrating a first embodiment of a feature to prevent axial sliding of the carrier bearing relative to the stator due to thermal growth.

The electromagnetic field created by stator 15 rotates a rotor 17 located within inner diameter 16. Rotor 17 is made up of a plurality of rotor sections 19 mounted on a shaft 21. The number of rotor sections 19 within a motor 11 depends on the length of the motor. Motors 11 may reach 30 feet or more in length and a typical motor may have 10-15 rotor sections 19 as an example. Each rotor section 19 is made up of a plurality of thin, flat disks or laminations. Referring to FIG. 2, each rotor section 19 has end rings 22 on its upper and lower ends. Rods (not shown) extend between and are secured to end rings 22 to retain the laminations of each rotor section 19. Rotor sections 19 are keyed to shaft 21 for causing rotation of shaft 21 in response to the electromagnetic field. Shaft 21 is supported at its upper end by a thrust bearing (not shown), and is free to thermally grow in a downward direction. Rotor sections 19 are stacked on top of each other. The stack of rotor sections 19 is supported at a lower end on a retainer ring secured to shaft 21. In this embodiment, rotor sections 19 are free to slide upward a limited amount relative to shaft 21.

Carrier bearings 23 are located between each rotor section 19 for providing radial stabilization of shaft 21. Each carrier bearing 23 has one or more anti-rotation rings or members 25 on its outer diameter that frictionally engages stator inner diameter 16. Anti-rotation members 25 prevent rotation of carrier bearings 23 with shaft 21. Various types of anti-rotation members may be employed.

A bushing 29 slides closely over shaft 21 and is keyed to shaft 21 for rotation with it. In this embodiment, bushing 29 has an upper end that engages the rotor section 19 directly above it and a lower end that engages the rotor section 19 directly below it. Consequently, in the embodiment of FIG. 2, an upward force imposed on the lowermost rotor section 19 will be transmitted through the rotor stack to the uppermost rotor section 19 via bushings 29.

Carrier bearing 23 has a hub 31, which is a cylindrical member that has an inner diameter in sliding engagement with bushing 29. In this embodiment, an upper thrust washer 33 is located on the upper end of carrier bearing hub 31 and a lower thrust washer 34 is located on the lower end of carrier bearing hub 31. The length of the central portion of carrier bearing 23 including hub 31 and thrust washers 33, 34 is approximately the same as the length of bushing 29. Upper and lower thrust washers 33, 34 may initially be touching or only slightly spaced from the adjacent rotor sections 19. Each thrust washer 33, 34 is formed of a relatively soft, deformable material. For example, thrust washers 33, 34 may be formed of approximately 99% polytetrafluorethylene (PTFE). It is not essential that the material be resilient, and the deformation can be permanent.

Carrier bearing 23 also has a body 35 that extends radially out from hub 31. Body 35 in this example does not have the same axial height as hub 31, but it could have approximately the same height, if desired. Carrier body 35 has a plurality of ports 37 extending from the upper to the lower side for lubricant flow. Hub 31 has an inner diameter that is in sliding engagement with the outer diameter of bushing 29. In the example of FIG. 2, two anti-rotation rings 25 are illustrated, but it could comprise one, if desired. Also, rather than rings, other devices to prevent rotation of carrier bearing 23 may be employed, such as spring loaded pins and the like.

Prior to operation, carrier bearing 23 may appear as in FIG. 2, approximately equidistant between adjacent rotor sections 19. During operations, motor 11 generates heat which can reach several hundred degrees F. This heat causes thermal growth of shaft 21 and rotor sections 19. Rotor sections 19 may thermally grow upward relative to shaft 21; alternately, the torque on shaft 21 may cause slight twisting of shaft 21, tending to prevent rotor sections 19 from moving relative to shaft 21. If so, rotor sections 19 would move downward in unison with shaft 21 as it grows thermally. In either event, it is desired that carrier bearings 23 do not move axially in unison with rotor sections 19 because such movement would cause anti-rotation members 25 to slide on the inner diameter 16 of stator 15.

Figure 3:
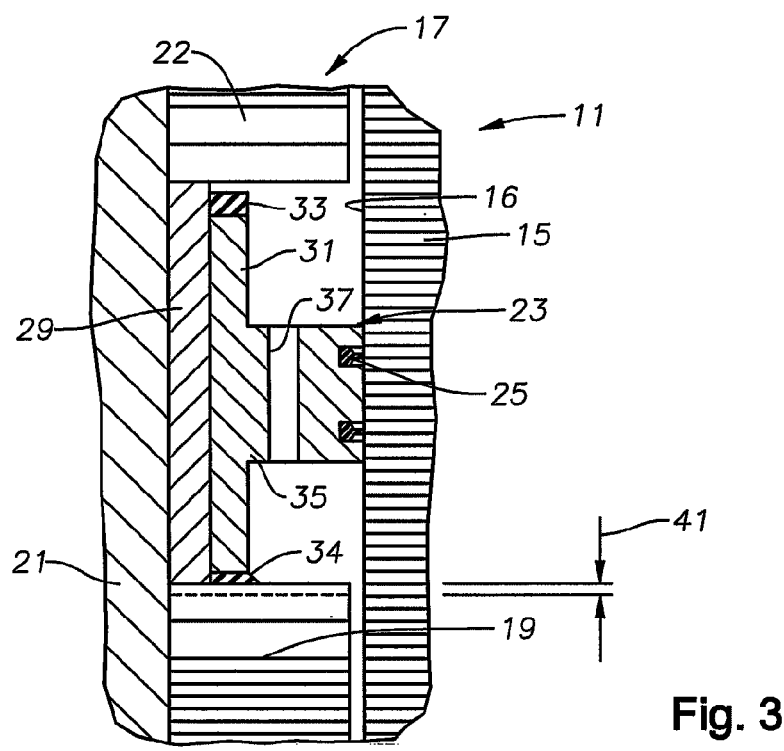
FIG. 3 is a partial sectional view of the portion of the motor shown in FIG. 2, but illustrating the carrier bearing after thermal growth of the rotor relative to the stator has occurred.

Even if rotor sections 19 move axially relative to stator 15, carrier bearings 23 can remain stationary relative to stator 15 because thrust washers 34 will deform. In the example, of FIG. 3, upward thermal growth of rotor section 19 has resulted in lower thrust washer 34 deforming or becoming less thick in an axial direction as shown in FIG. 3. The numeral 41 illustrates thermal growth of rotor section 19 that has occurred relative to carrier bearing 23. The softness of thrust washers 33, 34 causes thrust washer 34 to deform before the thermal growth force is sufficient to cause anti-rotation members 25 to lose their grip with stator inner diameter 16. Carrier bearing 23 thus remains stationary while bushing 29 and rotor sections 19 move upward relative to carrier bearing body 35. Note that a clearance now exists between upper thrust washer 33 and the upper rotor section 19. If motor 11 is turned off, the cooling may cause rotor sections 19 to move back to the original position shown in FIG. 2. Lower thrust washer 34 may or may not expand back to its original thickness, depending upon the type of material utilized.

Figure 4:
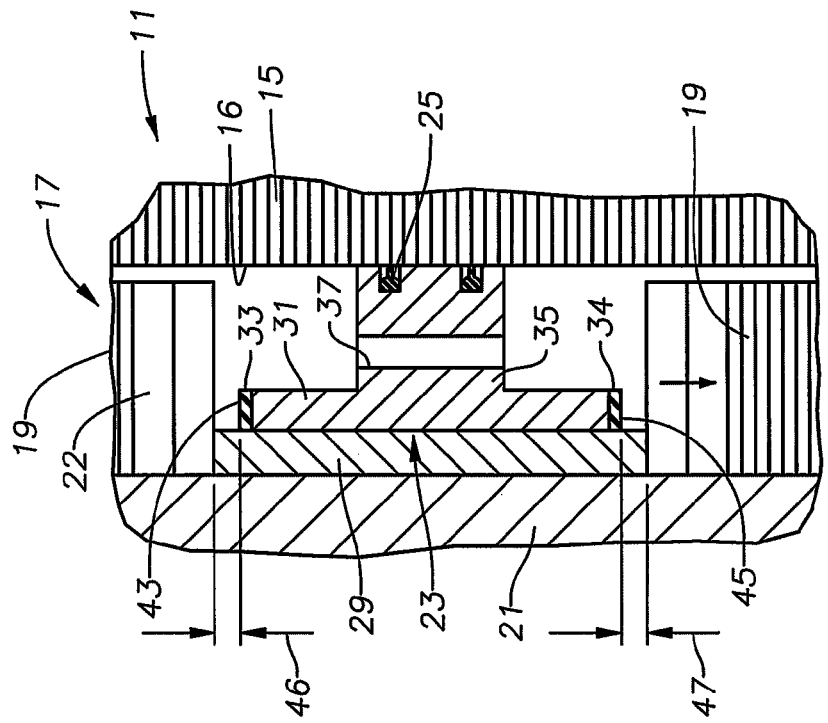
FIG. 4 is a view illustrating a first step in a second embodiment to prevent axial movement of the carrier bearing.
Figure 5:
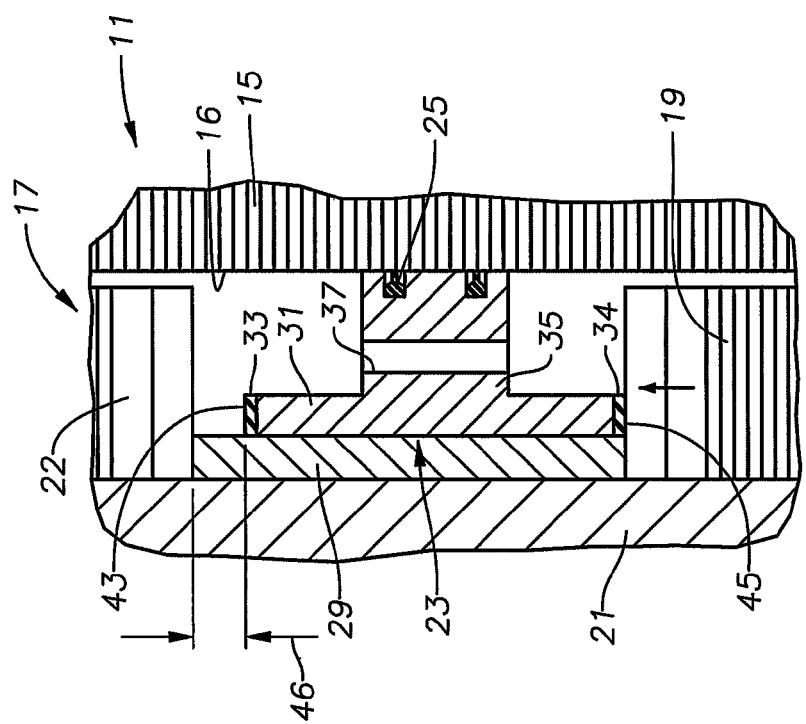
FIG. 5 is a view similar to FIG. 4, but shown after a second step, wherein the carrier bearing hub ends are spaced from contact with the adjacent rotor sections.

In the second embodiment, illustrated in FIGS. 4 and 5, the same numerals will be employed as in the embodiment of FIGS. 2 and 3 for components that are the same. In this embodiment, bushing 29 is made longer than the central portion of carrier bearing 23, which includes carrier bearing hub 31 and thrust washers 33 and 34, if they are employed. Thrust washers 33 and 34 are optional in this embodiment. If utilized, they could be of the same material as in the first embodiment or of conventional materials. The length of the central portion of carrier bearing from upper end 43 to lower end 45 is less than the length of bushing 29, which is the same as the distance between adjacent rotor sections 19. When motor 11 is first assembled, it is desired that each carrier bearing 23 be properly spaced from its adjacent rotor sections 19, having the desired initial gaps 46, 47 between its ends 43, 45 and the adjacent rotor sections 19. When finally assembled, gap 46 at upper end 43 may be identical to gap 47 at lower end 45, as shown in FIG. 5 or they may differ.

To achieve the desired initial spacing during assembly, the operator will slide a first rotor section 19 onto shaft 21, then a first carrier bearing 23, then a second rotor section 19, and so on until the entire length of rotor 17 is made up. The operator then slides rotor 17 into stator inner diameter 16. As the operator pushes rotor 17 into stator 19, anti-rotation members 25 will frictionally engage the stator inner diameter 16 and slide axially as the pushing movement continues. The insertion of rotor 17 could be from the upper end or the lower end of motor 11, as the terms "upper" and "lower" are used herein merely for convenience. Assuming that one is pushing rotor 17 in from the lower end, hub lower end 45 will be contacted by the rotor section 19 immediately behind it, thus there will be no lower gap as illustrated in FIG. 4. Initially a larger gap 46 than desired will appear at the upper end. When the entire rotor 17 has been inserted, the operator then moves rotor 17 back in the lower direction for an increment as indicated in FIG. 5. The operator moves it for an increment that is selected to be half of the difference between the length of one of the bushings 29 less the length of one of the central portions of carrier bearing 23. That rearward movement results in lower gap 47 being equal to upper gap 46. Preferably, gaps 46, 47 are selected to be equal to or slightly greater than any thermal growth that may occur in the expected range of temperatures. Consequently, even when the maximum thermal growth has occurred, the adjacent lower rotor section 19 will not be exerting an upward force on carrier bearing hub 31. A slight lower gap 47 would still exist.

While equal gaps 46, 47 between the upper end 43 and lower end 45 are illustrated in FIG. 5, it is possible that the operator may wish to have a greater initial gap 47 on the lower side than gap 46 on the upper side. Furthermore, the operator may wish to change the dimensions of initial gaps 46, 47 along the length of motor 11 so that their dimensions differ at different points along motor 11.

In the embodiment of FIG. 6, a different method is utilized to initially position the carrier bearing 23 such that it has gaps between its hub ends 43, 45 and adjacent rotor sections 19. During assembly, the operator positions a sacrificial spacer ring 49 between hub upper end 43 and the upper rotor section 19. The operator places another spacer ring 49 between hub lower end 45 and the adjacent lower rotor section 19. The upper and lower spacer rings 49 may be of the same thickness or may differ. Preferably, each spacer ring 49 is in contact with one of the carrier bearing central portion ends 43 or 45 and one of the rotor sections 19. Spacer rings 49 properly locate carrier bearing 23 between adjacent rotor sections 19. Thrust washers could be located on the ends of hub 31, if desired, such as shown in FIG. 4, and spacer rings 49 would be above and below the thrust washers.

The material of sacrificial spacer rings 49 may be selected so as to dissolve when the motor 11 begins to operate, and if so, it would be a material compatible with and that can be dissolved in motor lubricant without impairing the function of the lubricant, for example, a wax. The sacrificial spacer rings 49 may be left in place and will not dissolve until motor 11 begins operation when installed at the site. Once they dissolve, gaps or clearances, such as gaps 46, 47 in FIG. 5, would exist between ends 43 and 45 and upper and lower adjacent rotor sections 19.

In another embodiment related to FIG. 6, the sacrificial spacer rings 49 could be made of a material that can be melted after assembly, but before motor 11 is put into operation. The material would dissolve upon the introduction of solvents, and then be flushed from the motor components before the motor is filled with lubricant.

Referring to FIG. 7, in this embodiment, bushing 55 has a length that is less than the initial distance from one rotor section 19 to another. Consequently, thermal growth will not cause an axial force to be transmitted from a lower rotor section 19 through bushing 55 to the next upper rotor section 19. Also, as in the embodiment of FIGS. 4-6, the length of carrier bearing hub 31 is less than the distance between adjacent rotor sections 19. In this example, the length of carrier bearing hub 31, including upper and lower thrust washers 33, 34, if any, is the same length as bushing 55, but it could be a different length. Thrust washers 33, 34 could be eliminated if desired.

A retainer ring 51 is mounted in a groove 53 adjacent the lower end of each rotor section 19. Retainer ring 51 may be any type of ring, such as a split snap ring. Each retainer ring 51 will transmit an axial force from shaft 21 to the next forward rotor section 19 as rotor 17 is being pushed into stator inner diameter 16. Retainer ring 51 is preferably located at only one of the ends of each rotor section 19 to allow each rotor section 19 to thermally grow relative to shaft 21. Initially, it will be desired to position each carrier bearing 23 so that it is properly spaced from adjacent rotor sections 19. That can be done by the method of FIGS. 4 and 5 during assembly, or it could be done by utilizing a sacrificial spacer ring 49 as in the embodiment of FIG. 6. It is not necessary to center bushing 55, but it could be centered by the same methods in connection with the embodiments of FIGS. 4-6.

During operation, the thermal growth of each rotor section 19 will not affect the movement of its adjacent rotor section 19 because bushing 55 has a length that is less than the distance between adjacent rotor sections 19. Without retainer rings 51 and with bushings 29 extending the full distance between adjacent rotor sections 19, the thermal growth is compounded from one end of motor 11 to the other. For example, if the first rotor section 19 grew by 0.010 inch and if bushing 55 extended into engagement with the adjacent rotor section 19 as does bushing 29 in the embodiments of FIGS. 1-6, that thermal growth would be transmitted to the next upper rotor section. If that next rotor section 19 grew by 0.010 inch on its own, its upper end would move a total of 0.020 of an inch relative to its carrier bearing 23. This compounding of thermal growth thus could occur over 10 or 15 different rotor sections, resulting in the uppermost rotor section 19 moving a much greater distance relative to its carrier bearing 23 than the lowermost rotor section 19. By utilizing a shorter bushing 55 and retaining each rotor section 19 with its own snap ring 51, the compounding of incremental thermal growth does not occur.

Figure 8:
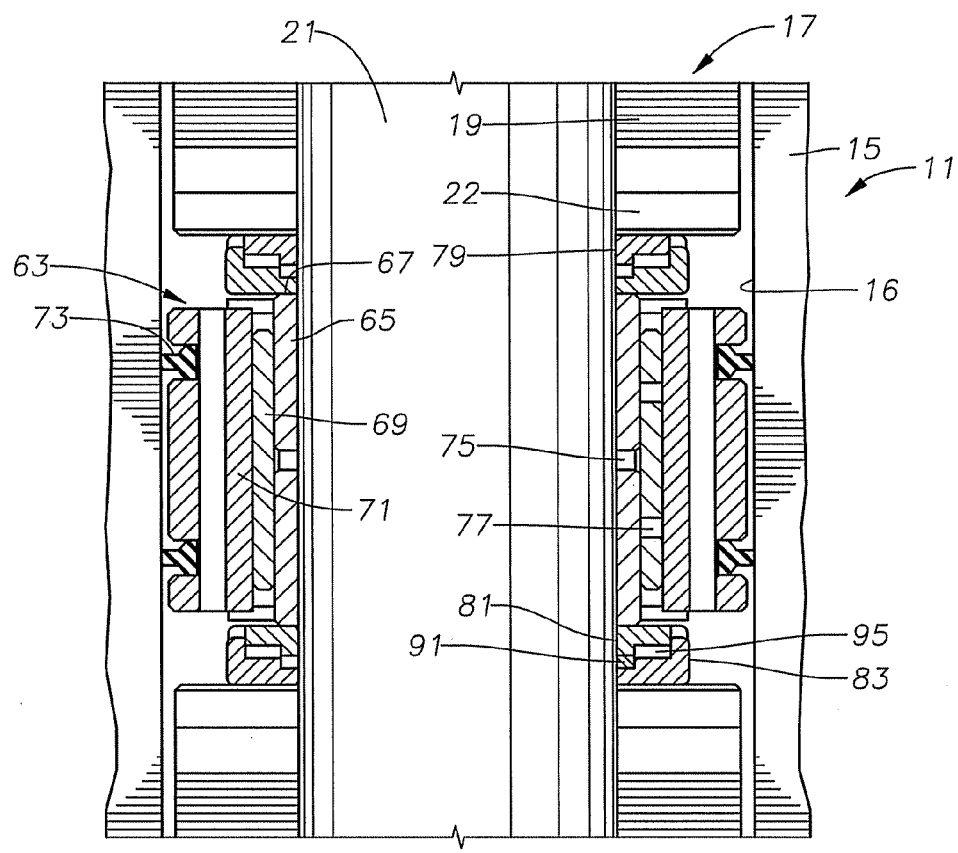
FIG. 8 is a view of a different carrier bearing and illustrating a fifth embodiment of a feature to prevent axial movement of the carrier bearing relative to the stator, this embodiment comprising a thrust washer assembly with varying thickness.
Figure 9:
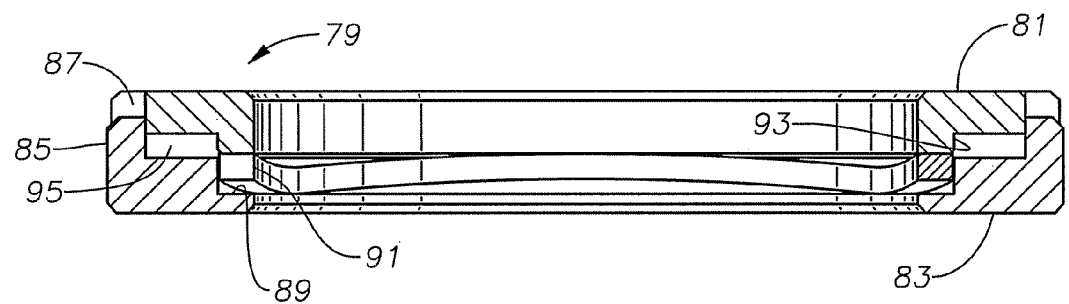
FIG. 9 is a sectional view of one of the thrust washer assemblies of FIG. 8 shown removed from the carrier bearing.
Figure 10:
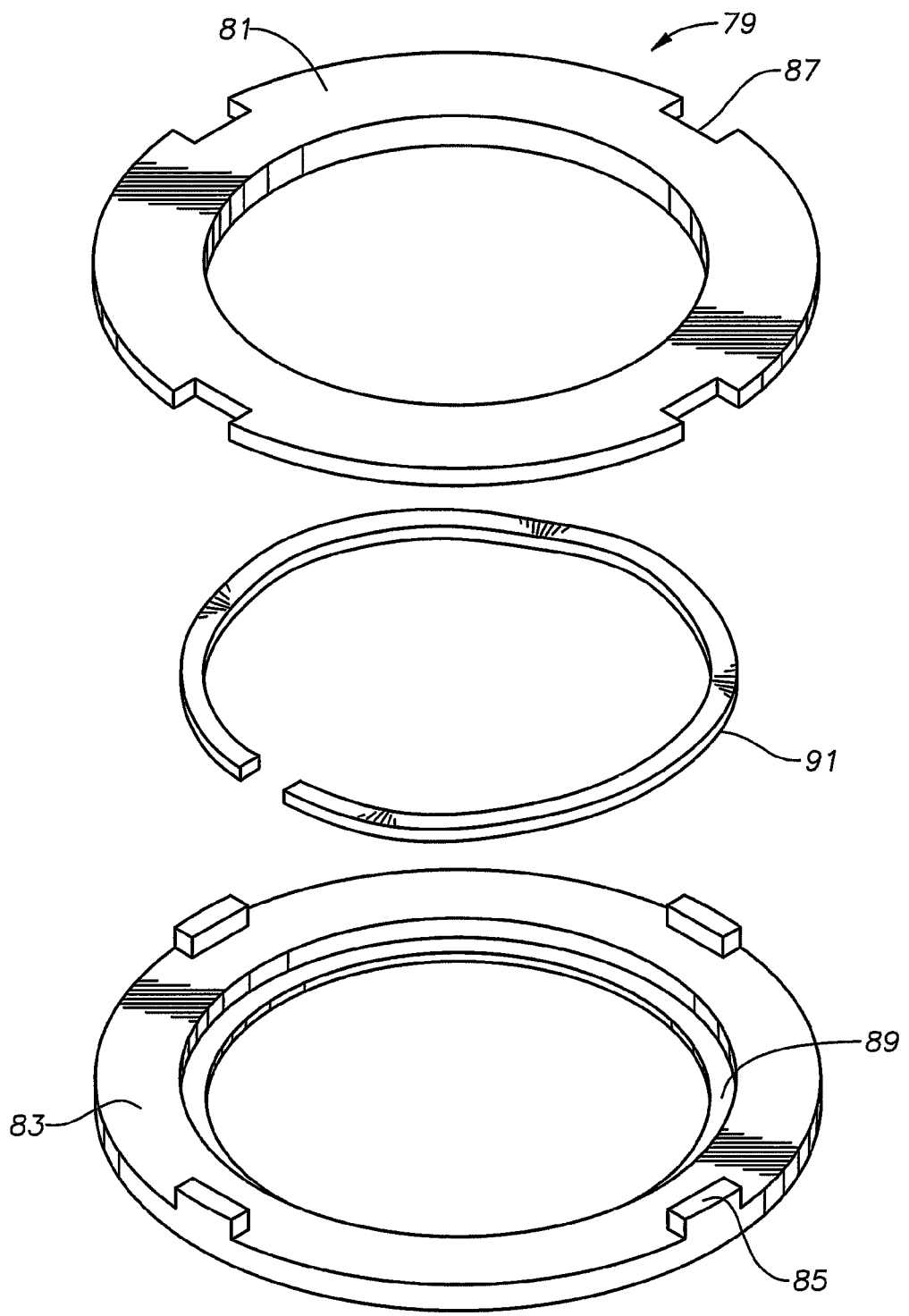
FIG. 10 is an exploded perspective view of the thrust washer assembly shown in FIG. 9.

The embodiment of FIGS. 8-10 shows a different carrier bearing 63 than carrier bearing 23. However, it could be the same as carrier bearing 23. Also, carrier bearing 63 could be employed in any of the embodiments of FIGS. 1-7. Carrier bearing 63 has a bushing 65 that has a length less than the distance between adjacent rotor sections 19. In this example, the gap between bushing ends 67 and the adjacent rotor sections 19 is equal on the upper and lower ends. An inner sleeve 69 is employed with carrier bearing 63. Inner sleeve 69 is rotatable relative to bushing 65 and is located within an outer sleeve 71. Anti-rotation members 73 may be the same type as shown in the other embodiments or a different type. In carrier bearing 63, a port 75 extends through bushing 65 in fluid communication with ports 77 within inner sleeve 69. A passage (not shown) extends through shaft 21 to supply lubricant to ports 75 and 77. A thrust washer assembly 79 is located on the upper and lower ends of carrier bearing 63 and bushing 65.

Referring to FIGS. 9 and 10 as well, thrust washer assembly 79 includes an upper ring 81 and a lower ring 83. As shown in FIG. 10, rings 81, 83 have mating lugs 85 and slots 87 to prevent relative rotation between rings 81, 83. Lower ring 83 has a recessed counterbore 89 adjoining its inner diameter. A circular, split, wavy spring 91 locates on counter bore 89. As shown in FIG. 9, a wavy spring 91 is not located in a single plane; rather it has undulations around it. Upper ring 81 has a depending lip 93 on its inner diameter that abuts the upper side of wavy spring 91. In its natural position shown in FIG. 9, a gap 95 will exist between upper and lower rings 81, 83. FIG. 9 illustrates thrust washer assembly 79 at its maximum thickness position. When upper and lower rings 81, 83 are pushed toward each other to close gap 95, wavy spring 91 will deform and thrust washer assembly 79 compresses to a less thick position. When the force is released, wavy spring 91 will urge upper and lower rings 81, 83 back to the initial thickness position.

After initial installation, both thrust washer assemblies 79 will be in the natural position shown in FIG. 9, which is at the maximum thickness. One side of each thrust washer assembly 79 will be in abutment with an adjacent rotor section 19. Another side of each thrust washer assembly 79 will be in abutment with an end 67 of bushing 75. The distance from each end 67 of bushing 65 to an adjacent rotor section 19 is the same on the upper end as on the lower end. During operation, as the motor begins to heat up, thermal growth may cause rotor sections 19 to move in the upward direction. The thermal growth will begin compressing the lower thrust washer assembly 79, reducing its gap 95. Carrier bearing 71 would not experience any axial upward force until the lower thrust washer assembly 79 completely closes gap 95. Gap 95 is preferably sufficient to accommodate the expected thermal growth so as to avoid any axial forces on anti-rotation member 73.

While the invention has been shown in only a few of its forms, it should be apparent to those skilled in the art that it is not so limited but is susceptible to various changes without departing from the scope of the invention.

The invention claimed is:

1. A method of assembling and operating a submersible well pump motor, comprising:
   (a) providing a stator with a central bore;
   (b) making up a rotor assembly with a shaft with an axis, first and second rotor sections spaced apart from each other, and a carrier bearing having an anti-rotation member and a central portion located between the first and second rotor sections, and mounting a deflectable thrust washer between a hub of the carrier bearing and an end of the second rotor section;
   (c) inserting the rotor assembly into the bore of the stator with the anti-rotation member in frictional engagement with the stator;
   (d) installing the motor in a well and operating the pump;
   (e) allowing the shaft and the rotor sections to thermally grow axially in response to an increase in temperature of the motor, causing the deflectable thrust washer to reduce in thickness in response to a thermal growth axial force imposed on the thrust washer due to the thermal growth; and wherein
   the magnitude of the thermal growth axial force that causes the reduction in thickness is less than a dislodging force required to move the anti-rotational member axially within the stator.

2. The method according to claim 1, wherein step (b) comprises: forming the thrust washer of a deformable material that is sufficiently soft to deform the thrust washer to the reduced thickness at a force less than the dislodging force.

3. The method according to claim 2, wherein the deformable material of step (b) comprises polytetrafluorethylene.

4. The method according to claim 1, wherein the thrust washer is elastically movable from a maximum to a minimum thickness and is elastically biased to the maximum thickness; and
   step (e) comprises moving the thrust washer from the maximum thickness toward the minimum thickness in response to the thermal growth axial force.

5. The method according to claim 1, wherein:
   step (b) comprises:
   mounting a bushing on the shaft with a length greater than the central portion of the carrier bearing plus the thrust washer, and inserting the central portion of the carrier bearing over the bushing; and step (c) comprises:
   inserting the rotor assembly into the bore of the stator in a first direction and axially sliding the anti-rotational member in frictional engagement with the bore of the stator, the frictional engagement causing the thrust washer to contact the second rotor section;
   when the anti-rotational member is at a desired axial position within the bore of the stator, moving the shaft, the rotor sections and the bushing in a second direction a selected axial increment relative to the carrier bearing, which is held against axial movement by the frictional engagement of the anti-rotation member with the bore of the stator, the selected axial increment axially centering the carrier bearing between the first and second rotor sections and axially spacing the thrust washer from the second rotor section.

6. The method according to claim 1, wherein step (b) comprises:
   with a first retainer, axially securing a lower end of the first rotor section to the shaft, the first rotor section having an upper end that is free to move axially relative to the shaft in response to thermal growth;
   with a second retainer, axially securing a lower end of the second rotor section to the shaft, the second rotor section having an upper end that is free to move axially relative to the shaft in response to thermal growth; and
   mounting a bushing between the first and second rotor sections, the bushing having an axial length less than an axial distance between the first and second rotor sections, defining an initial axial clearance, the carrier bearing slidably receiving the bushing and having an axial length, including the thrust washer, that is less than the axial distance between the first and second rotor sections; and
   wherein the thermal growth of the second rotor section is less than the initial axial clearance, thereby preventing the thermal growth of the second rotor section from pushing the bushing into contact with the first rotor section.

7. A method of assembling and operating a submersible well pump motor, comprising:

(a) providing a stator with a central bore;
(b) making up a rotor assembly with a shaft with an axis, first and second rotor sections spaced apart from each other, and a carrier bearing having an anti-rotation member and a central portion located between the first and second rotor sections, and mounting a thrust washer between a hub of the carrier bearing and an end of the second rotor section, the thrust washer being elastically movable from a maximum to a minimum thickness and elastically biased to the maximum thickness;
(c) inserting the rotor assembly into the bore of the stator with the anti-rotation member in frictional engagement with the stator;
(d) installing the motor in a well and operating the pump;
(e) allowing the shaft and the rotor sections to thermally grow axially in response to an increase in temperature of the motor, causing the thrust washer to move from the maximum thickness toward the minimum thickness in response to a thermal growth axial force imposed on the thrust washer due to the thermal growth; and wherein
the magnitude of the thermal growth axial force that causes the movement of the thrust washer toward the minimum thickness is less than a dislodging force required to move the anti-rotational member axially within the stator.

8. A method of assembling and operating a submersible well pump motor, comprising:
(a) providing a stator with a central bore;
b) making up a rotor assembly with a shaft with an axis, first and second rotor sections spaced apart from each other, and a carrier bearing having an anti-rotation member and a central portion located between the first and second rotor sections, and mounting a thrust washer between a hub of the carrier bearing and an end of the second rotor section, the thrust washer being formed of a deformable material;
(c) inserting the rotor assembly into the bore of the stator with the anti-rotation member in frictional engagement with the stator;
(d) installing the motor in a well and operating the pump;
e) allowing the shaft and the rotor sections to thermally grow axially in response to an increase in temperature of the motor, the thermal growth creating a thermal growth axial force on the thrust washer that causes the thrust washer to deform to a reduced thickness; and wherein
the deformable material is sufficiently soft to deform the thrust washer to the reduced thickness at a force less than a dislodging force required to move the anti-rotational member axially within the stator.

\* \* \* \* \*